June 20, 1933.  H. A. FOOTHORAP  1,914,885
SHOCK ABSORBING MECHANISM FOR TYPEWRITING MACHINES
Filed April 25, 1931   3 Sheets-Sheet 1
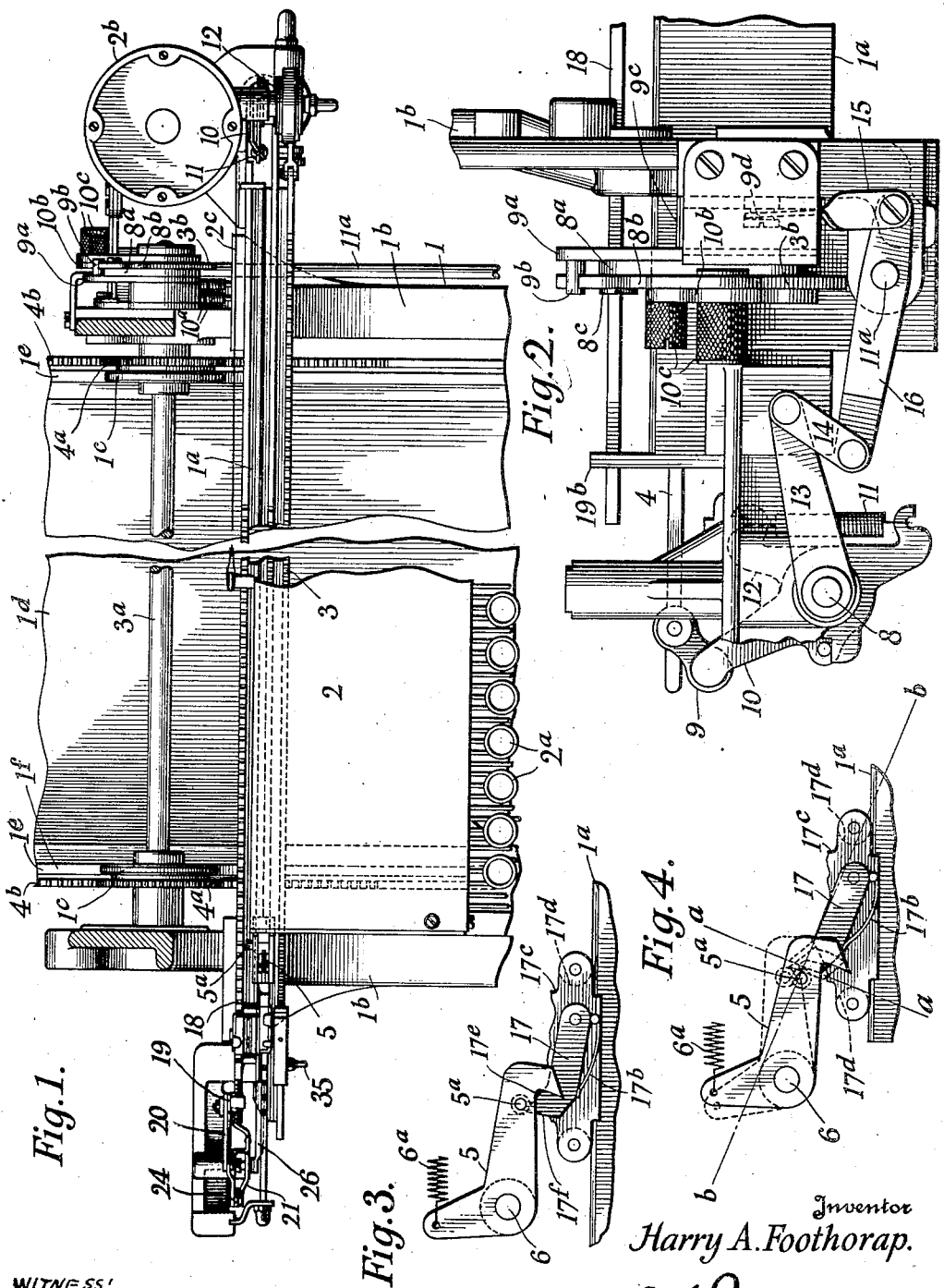
Inventor
Harry A. Foothorap.

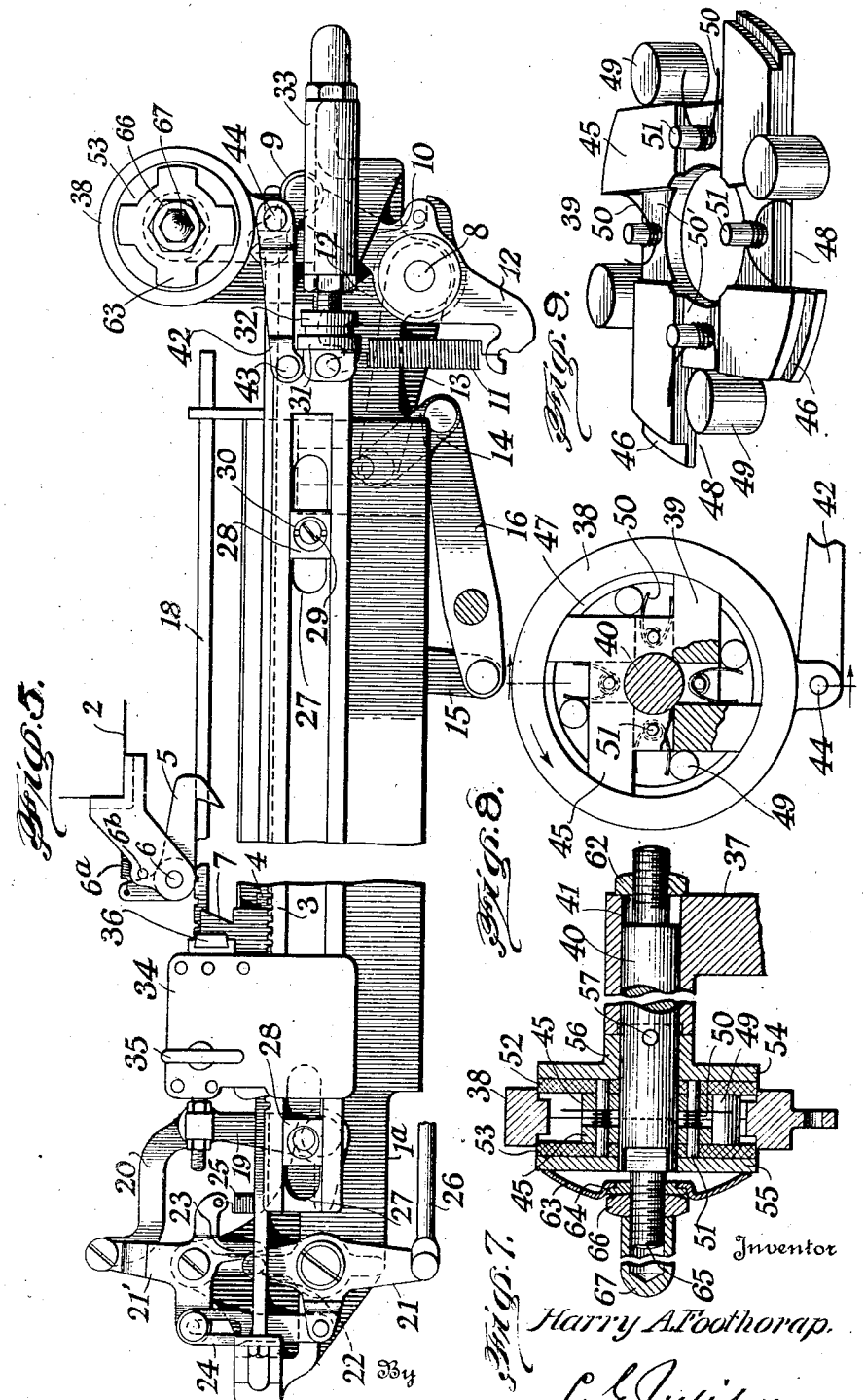

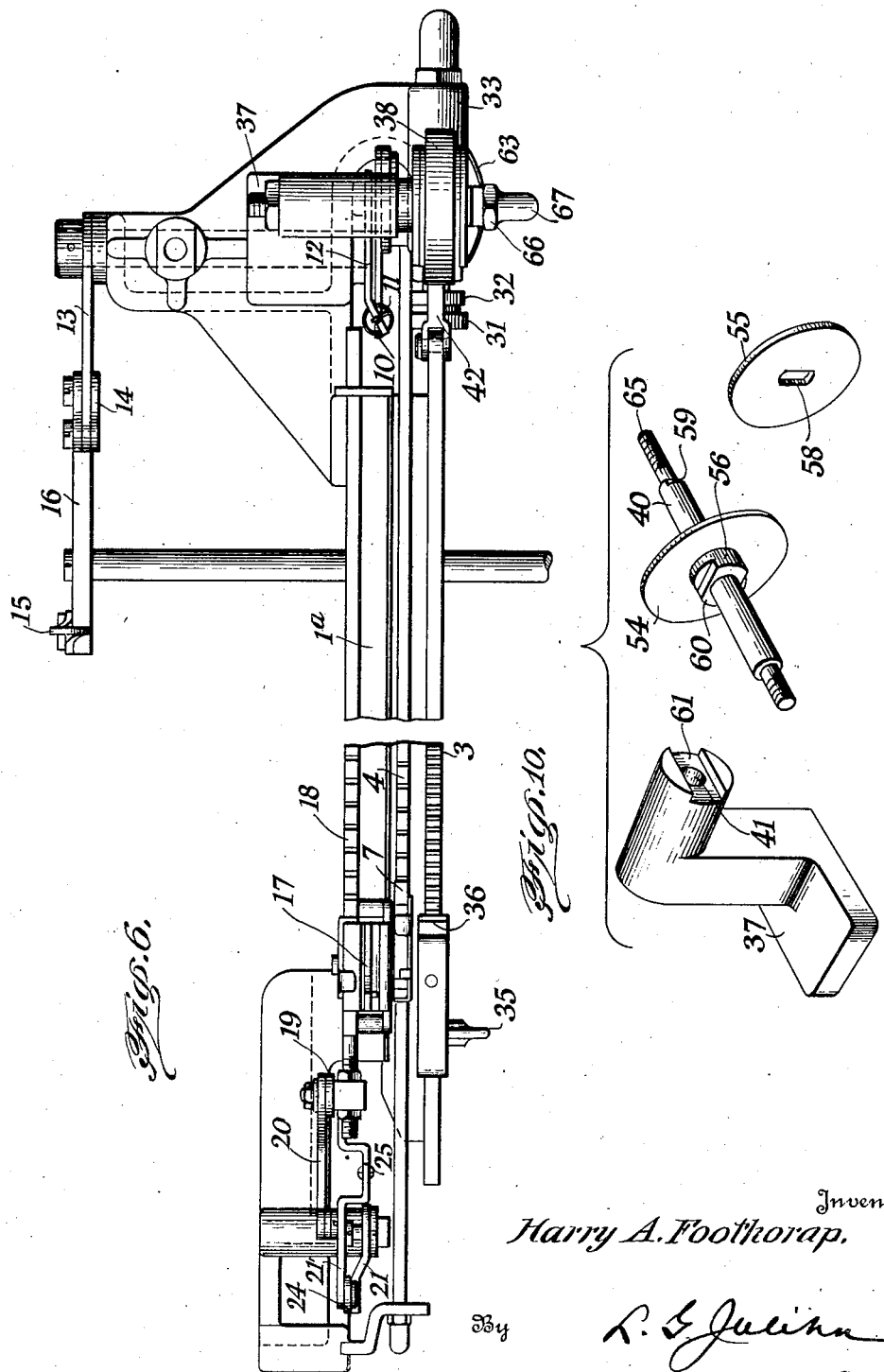

Patented June 20, 1933

1,914,885

UNITED STATES PATENT OFFICE

HARRY A. FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE

SHOCK ABSORBING MECHANISM FOR TYPEWRITING MACHINES

Application filed April 25, 1931. Serial No. 532,811.

My invention relates to improvements in shock absorbing mechanism for typewriting machines, and more particularly to shock absorbing mechanism for the carriage of the Elliott-Fisher billing machine of commerce.

In my co-pending applications Serial Nos. 135,210 and 532,810, respectively, I have disclosed, in the first instance, an exemplification of a machine of the above type equipped with line space mechanism operative by return movement of the carriage to different marginal positions and, in the second instance, with the line lock release mechanism operated by advance movement of the carriage from said marginal positions. The line space and line lock release mechanisms are adapted to be set for operation in timed relation to movement of the carriage to and from said different marginal positions, respectively.

It is the principal object of my present invention to provide a simple and durable form of shock absorbing mechanism for arresting particularly the carriage of the Elliott-Fisher machine without shock or jar at the end of its return to different marginal positions in timed relation to operation of the line space mechanism and for absorbing shock or jar incident to rebound of the carriage from marginal position.

Another object of my invention is to provide a shock absorbing mechanism of the frictional resistance type and which is capable of a wide range of minute adjustments to thereby effect correspondingly fine degrees of variations in the frictional resistance opposed to movement of the carriage.

To the accomplishment of the above and other objects presently appearing a preferred embodiment of my invention has been illustrated in the accompanying drawings and will now be set forth in detail in the following description and defined in the claims appended thereto.

In said drawings:

Figure 1 is a view in top plan of a portion of an Elliott-Fisher machine equipped according to my invention, Fig. 2 is an enlarged fragmentary view in rear elevation of line space mechanism forming part of the equipment of the machine, Fig. 3 is a front elevation of elements of line lock release mechanism illustrating the cooperative relation of said elements during return of the carriage of the machine, Fig. 4 is a similar view illustrating operation of said elements to release a line locked condition of the line space mechanism, Figure 5 is a fragmentary view in front elevation of part of the line space frame of the machine and my novel shock absorbing mechanism.

Fig. 6 is a top plan view,

Fig. 7 is a view in transverse vertical section, drawn to an enlarged scale, of a frictional resistance unit forming part of my shock absorbing mechanism, Fig. 8 is a view in rear elevation, partly in section, illustrating the interior construction of said unit, Fig. 9 is a perspective view of a clutch spider and immediately associated parts forming part of the frictional resistance unit, and Fig. 10 is a disassembled perspective view of a bracket, a shaft, and friction discs forming part of the frictional resistance unit.

By way of explanation it may be stated that the type of Elliott-Fisher machine, with which my invention is more particularly concerned embodies a rectangular line space frame mounted to travel over a subjacent flat platen longitudinally of the work, and a carriage mounted on the line space frame to be advanced and returned transversely of the work and supporting down strike printing mechanism. The said frame is moved to line space the printing mechanism over the work through the medium of line spacing mechanism operated in this instance by return movement of the carriage. The carriage is geared to the carriage feed rack for advance under control of the usual escapement to letter space the printing mechanism. The carriage and printing mechanism may be manually retracted or as in the case of my aforesaid application Serial No. 135,210 by motor operated carriage retracting mechanism.

In the drawings 1 designates a portion of a line space frame of an Elliott-Fisher machine including rear and end bar members 1$^a$ and 1$^b$ and mounted by rollers as at 1$^c$ for line space movement, longitudinally of a sub-jacent flat platen 1$^d$, upon side members 1$^e$ of a platen frame 1$^f$. The numeral 2 designates a portion of the usual carriage, which supports the down-strike printing mechanism, including keys 2$^a$, and is mounted on the frame 1 for advance, in a letter feed direction, by the usual carriage advancing spring 2$^b$ and tape 2$^c$ and under control of escapement mechanism, shown in my U. S. Patent No. 1,203,519 of October 31, 1916, cooperating with a feed rack 3 to effect a step by step letter feed of the carriage. As will be understood the escapement permits free return of the carriage in a contra letter feed direction. Such features as the printing mechanism, proper, the carriage mounting on the frame, and the escapement mechanism being well known and understood in the art have not been illustrated in the drawings.

The frame 1 is moved by the carriage 2 to line space the printing mechanism through the medium of a toothed draw bar 4 coupled to the carriage 2 as the latter nears the end of its return movement. For this purpose a coupling hook 5 is pivoted on the carriage 2, as at 6, to couple to a block 7 adjustable along the teeth of the bar 4 to effect line spacing in timed relation to return of the carriage to different marginal positions. A spring 6$^a$ normally holds the coupling hook 5 against a stop of 6$^b$ to be raised against the tension of said spring.

Operation of the draw bar 4 rocks shaft 8 to which it is connected by link 9 and an arm 10 the latter loose on said shaft 8 but operatively connected to said shaft by spring 11 and an arm 12 providing a yielding safety connection for a purpose which will be understood. The shaft 8 is operatively connected to the line space mechanism by an arm 13 fast on the shaft 8 and links 14 and 15 connected to opposite ends of lever 16 and to the arm 13 and the line space mechanism respectively. The line space mechanism referred to is disclosed in detail in my U. S. Patent No. 1,275,413 of August 13, 1918. Suffice it to explain herein that a line space shaft 3$^a$, upon which the aforesaid rollers 1$^c$ are mounted, is suitably journaled on the line space frame 1 to drive the same over the platen 1$^d$ by means of gears 4$^a$ fast on said shaft 3$^a$ and meshing with racks 4$^b$ on the frame 1$^f$. A toothed line space wheel 3$^b$ is fast on said shaft. A dog carrier 8$^a$ is freely mounted on the line space shaft 3$^a$. A line space dog 8$^b$ is pivoted as at 8$^c$ on the dog carrier 8$^a$ to be rocked thereon in opposite directions to engage and release the teeth of the line space wheel 3$^b$. Freely mounted on said shaft 3$^b$ is a dog rocker 9$^a$ operatively connected to the dog 8$^b$ as at 9$^b$ and movable forwardly and reversely. Initial forward movement of the dog rocker 9$^a$ engages the line space dog 8$^b$ with the line space wheel 3$^b$ whereupon the parts become locked together, for movement in unison, to effect a line spacing operation of the shaft 3$^a$ upon continued forward movement of said rocker 9$^a$. Initial reverse movement of said rocker 9$^a$ releases said dog 8$^b$ and continued reverse movement thereof returns said rocker, carrier, and dog, idly to starting position. Suitably connected springs 10$^a$ act to return the dog rocker with a snap action to starting position as determined by a variable stop member 10$^b$ adjustable by means of screws 10$^c$. The shaft 11$^a$, upon which the lever 16 is fast, is part of means for manually operating the line space mechanism. The connection between the link 15 and the line space mechanism is to a hub 9$^c$ of the dog rocker 9$^a$ as shown at 9$^d$ in dotted lines in Fig. 2. The line space mechanism, as will now be seen, by virtue of limitation of movement thereof is adapted to assume and to be held by the carriage in a locked condition at the end of return of the latter, to lock the line space frame against overrunning and to snap back to unlocked condition when uncoupled from the carriage.

The uncoupling operation is effected by so called line lock release mechanism including a line lock release cam 17 adjustable along a toothed line lock release rod 18, for location slightly in advance of the coupling hook 5 when the carriage has reached the limit of its return movement, which is to say when it has completed the line space operation, and adapted upon slight advance movement of the carriage 2 to uncouple the hook 5 and hence the line space mechanism to thereby permit the latter to snap back into unlocked condition. Said cam 17 is pivoted as at 17$^a$ for depression against a spring 17$^b$ and in a cam carriage 17$^c$ having rollers 17$^d$ bearing on the rear member 1$^a$ to provide a rigid support for said cam and carriage. Oppositely inclined faces 17$^e$ and 17$^f$ are provided on said cam for engagement with a pin 5$^a$ on the coupling hook 5. The arrangement is such that upon return of the carriage 2, i. e., in a contra letter feed direction, the pin 5$^a$, under the urge of the spring 6$^a$, will wipe against face 17$^e$, depress the cam 17, (see Fig. 3) and assume a position slightly to the left of said cam, as viewed from the front of the machine, when the carriage has been fully returned. Conversely upon advance of the carriage 2 i. e., in a letter feed direction from its fully returned position the hook member 5 will be cammed upwardly to uncoupling position. To this end the arrangement of parts is such that the force of the pin 5$^a$ acting against the face 17', or vice versa, is so directed relative to the axes of the hook member 5 and cam 17, respectively, as to insure that its effective component must act in a direction to pass above both axes whereby a torque is produced acting to raise the hook member 5 against the action of its spring. In Fig. 6 this operation has been illustrated the parts being shown in normal position in full lines and the hook member raised in dotted lines. The dot and dash line a—a represents the angle of inclination of the face 17' and b—b the line of direction in which the normal effective component acts. A pin or lug, not shown, may be suitably located on the cam carriage 17$^c$ to limit upward movement of the cam 17 on its pivot 17$^a$.

The hook member 5 may also be raised to uncoupled position when the carriage has been fully returned by moving the line lock release rod 18 endwise, to the left, as viewed in Fig. 1, to engage the cam face 17' with the the pin 5$^a$. For this purpose said rod 18 is mounted at one end on a rocker 19 the other end sliding in a guide 19$^b$. A link 20 connects said rocker 19 with superposed bell cranks 21 and 21', respectively, operatively connected as by a pin 22 on one bell crank engaging an arm 23 on the other and also by a link 24 to move the line lock release rod 18 to the left upon movement of one bell crank 21, in either direction about its axis. A spring 25 normally holds the bell cranks 21, and 21' and the line space draw rod 18 in normal position. Said bell cranks are operated by a rod connection 26 to a manual control mechanism unimportant to the present invention and therefore not shown.

Coming now to my novel shock absorbing mechanism the beforementioned carriage feed rack 3 is mounted on the rear bar 1$^b$ of the line space frame for limited endwise movement from a normal position in the direction of return movement of the carriage 2, which in this instance is towards the left. For this purpose said rack is preferably slotted as at 27 to slide on guide blocks 28 secured to said rear bar 1 by screws 29 and eccentric sleeves 30 adjustable about said screws to properly align the rack. The rack 3 as will be understood is normally locked to the carriage through the escapement, as is usual, and is therefore constantly urged in the direction of advance of the carriage, in the present machine toward the right, by the pull of the carriage propelling spring. In the present instance movement in this direction is limited by co-operating buffer devices 31 and 32 located on the right hand end of rack 3 and on the frame 1, respectively, and establishing the normal position of said rack. The buffer element 31 is preferably resilient in character for a purpose which will be seen. The buffer device 32 is adjustable to vary the normal position of the rack 3 as desired said device having the form of a headed screw threaded into a suitable bracket 33 projecting from the bar 1.

Mounted on the rack 3 is a left hand margin stop 34 adjustable along said rack by suitable clamping devices (not shown) actuated by a thumb screw 35 to clamp the stop 34 in selected marginal position. A resilient buffer element is suitably affixed to the margin stop as at 36 for engagement with a suitable stop on the carriage not shown.

Adjacent the right hand end of the rack 3 is a frictional resistance device mounted on a bracket 37 extending from the bar 1. The frictional resistance device preferably includes inner and outer clutch units in the form of clutch annulus 38 and a clutch spider 39, respectively, rotatable concentrically upon one end a shaft 40 fixed at the other end in a bore 41 in the bracket 37 by devices presently explained. A link 42 has its opposite ends connected to the clutch annulus 38 and the rack 3, respectively, as at 43 and 44, whereby the annulus is rotated in opposite directions by movement of said rack to and from normal position. The clutch spider 40 embodies two opposed plates 45 rabbeted to provide opposed grooves 46 in their outer edges receiving a central rib 47 on the clutch annulus 38 whereby the latter is rotatably mounted on said spider and held against lateral displacement. The outer edges of the plates 45 are formed to provide notches 48 in the clutch spider forming with the inner face of said annulus 38 pockets converging in the direction in which said annulus is rotated by movement of the rack from normal position. Clutch detent rollers 49 are located in said pockets and urged a U-shaped springs 50 in the direction of convergence of the pockets whereby the spider is clutched to the annulus upon rotation of the latter by movement of the rack 3 from normal position and released therefrom upon rotation of the annulus in the opposite direction. The springs 50 are secured in radial slots 50' in the clutch spider 39 by pins 51 passing through the plates 45 to key them together and projecting beyond the outer sides of the plates for a purpose presently seen.

A pair of friction discs, 52 and 53 respectively, of rubberized fabric or similar material and suitably bored to receive the shaft 40, are mounted upon opposite sides of the clutch spider 39 to rotate therewith as by the projecting ends of said pins 51. Opposed to the friction discs 52 and 53, so that the latter rotates therebetween, is a pair of discs 54 and 55 mounted concentrically on the shaft 40 one in fixed position as by a hub member 56 pinned to said shaft as at 57, and the other by a sliding key connection in the form of a squared opening 58 in the disc and a squared portion 59 in the shaft. The hub 56 of disc 54 has a key portion 60 interlocking with a groove 61 on one side of the bracket 37 a nut 62 threaded onto the shaft on the other side of the bracket retaining the parts in interlocked relation to hold said shaft and discs 54 and 55 stationary. Adjacent the sliding disc 55 is a spring spider 63 mounted on a shouldered washer 64 adjustable on a reduced portion 65 of the shaft 40 whereby the clutch spider 39 and friction discs 52 and 53 may be clamped between the discs 54 and 55 to effect variable degrees of frictional resistance to rotation of said clutch spider 39 as will be clear. Friction regulating and lock nuts 66 and 67, respectively, are threaded on the reduced portion 65 of the shaft 40 for adjusting said washer 64 and spring spider 63 and retaining them in desired position.

Referring now to the operation of my invention, the margin stop 34 is adjusted along the rack 3 in accordance with a particular marginal requirement, so that a suitable part on the carriage 2 engages the buffer element 36 when the carriage 2 has returned, in a contra letter feed direction, to the selected marginal position. The coupling block 7 is adjusted along the draw bar 5 to couple the latter to the carriage 2 substantially co-incidentally with engagement of the carriage with said margin stop 34. The frictional resistance device is adjusted to permit overthrow return movement of the carriage, in a contra letter feed direction, in sufficient degree to operate the line space mechanism and to bring the carriage to rest co-incidentally with completion of said operation or in other words to effect stopping of the carriage in timed relation to operation of the line space mechanism to the limit of its movement to relieve said mechanism and carriage of shock and jar. Obviously the carriage 2, and rack 3, under the influence of the beforementioned propelling spring, will rebound from its overthrow position, in an advance, i. e. letter feed direction, back to normal position determined by the buffer devices 31 and 32 absorbing the shock incident to such rebound. Lastly the line lock release cam 17 is adjusted along its rod 18 to effect the line lock releasing operation in timed relation to rebound movement of the carriage 3.

By thus providing for cushioned overthrow and rebound movements, respectively, of the carriage 2 the latter is brought to a standstill in marginal position without shock and jar such as would be incident to its concussion with a rigid margin stop. By providing for operation of the line spacing and line lock release mechanisms by cushioned overthrow and rebound movement of the carriage two things are accomplished, first, elimination of shock incident to operation of the line space mechanism to the limit of its movement, and second, effecting the line lock release operation without extra load on the carriage advancing motor during letter spacing, and thereby obviating retarding the carriage during initial letter spacing from marginal position.

The foregoing is a detailed description of a preferred embodiment of my invention but it is to be understood that right is herein reserved to modifications and changes falling fairly within the scope of the protection prayed.

What I claim is:

1. In a machine of the class described, the combination with a carriage, and carriage operated line space mechanism, of shock absorbing mechanism operated by the carriage in timed relation to carriage operation of the line space mechanism.

2. In a machine of the class described, the combination with a carriage, of line space mechanism and shock absorbing mechanism, both operative by movement of the carriage, to different positions and in selectively timed relation.

3. In a machine of the class described, the combination with a carriage, of line space mechanism and shock absorbing mechanism, both operative by overthrow movement of the carriage from different marginal positions and in selectively timed relation.

4. In a machine of the class described, the combination wtih a carriage, and line space mechanism operative by return movement of the carriage to different positions of shock absorbing mechanism including means for opposing resistance to return of the carriage during operation of the line space mechanism and for selectively varying the degree of resistance opposed.

5. In a machine of the class described, the combination with a carriage, and line space mechanism operative by retraction of the carriage to different positions, of shock absorbing mechanism for opposing resistance to retraction of the carriage in timed relation to operation of the line space mechanism and including, an endwise movable rack, and means for opposing variable resistance to movement of the rack.

6. In a machine of the class described, the combination with a carriage, and line space mechanism operative by retraction of the carriage to different positions, of shock absorbing mechanism for opposing resistance to retraction of the carriage in timed relation to operation of the line space mechanism and including, an endwise movable rack, means for opposing variable resistance to movement of the rack, and an adjustable stop on the rack for engagement by the carriage.

7. In a machine of the class described, the combination with a carriage, carriage propelling means normally urging said carriage in an advancing direction, and line lock release mechanism settable for operation by advance movement of the carriage to different positions, of shock absorbing mechanism adjustable to establish different left hand marginal positions of the carriage and providing for overthrow retraction of the carriage therefrom, whereby said line lock release mechanism may be set for operation by advance of the carriage under the urge of said propelling means from overthrow to predetermined marginal positions.

8. In a machine of the class described, the combination with a carriage, carriage propelling means normally urging said carriage in an advancing direction, and line lock release mechanism settable for operation by advance movement of the carriage to different positions, of shock absorbing mechanism adjustable to establish different left hand marginal positions of the carriage and to provide for overthrow retraction of the carriage therefrom in different degree, whereby said line lock release mechanism may be set for operation by advance of the carriage in different degree from overthrow position to predetermined marginal positions.

9. In a machine of the class described, the combination with a carriage, and carriage propelling means normally urging said carriage in an advancing direction of shock absorbing mechanism for said carriage limiting advancing movement of the carriage under such urge of said means and providing for overthrow retracting movement of said carriage.

10. In a machine of the class described, the combination with a carriage, and carriage propelling means normally urging said carriage in an advancing direction, of shock absorbing mechanism for said carriage limiting advancing movement of the carriage under the urge of said means and providing for overthrow retracting movement of said carriage, and including means for selectively varying the degree of said advancing and retracting movement, respectively.

11. In a machine of the class described, the combination with a carriage, of shock absorbing mechanism therefor including an endwise movable rack, operated by movement of the carriage, co-operating rotary clutch members operatively engaged by movement of said rack, and means for opposing variable resistance to one of said clutch members.

12. In a machine of the class described, the combination with a carriage, of shock absorbing mechanism therefor including, an endwise movable rack operated by movement of the carriage, a clutch annulus rotatable by movement of the rack, a rotary clutch member located within the annulus, means for causing a clutching relation between the member and annulus upon rotation of the latter, and means for opposing variable resistance to rotation of said member.

13. In a machine of the class described, the combination with a carriage, of shock absorbing mechanism therefor including, an endwise movable rack operated by movement of the carriage, a clutch annulus rotatable by movement of the rack, a rotary clutch member located within the annulus means for causing a clutching relation between the member and annulus upon rotation of the latter, non-rotatable friction discs upon opposite sides of said member, and means for yieldingly clamping said discs against the sides of said member to oppose rotation thereof.

14. In a machine of the class described, the combination with a carriage, of shock absorbing mechanism therefor including, an endwise movable rack operated by movement of the carriage, a clutch annulus rotatable by movement of the rack, a rotary clutch member located within the annulus, means for causing a clutching relation between said member and annulus upon rotation of the latter, friction discs fixed upon opposite sides of the clutch member, respectively, to rotate therewith, and non-rotatable friction discs yieldingly engaged with said first discs.

15. In a machine of the class described, the combination with a carriage, of shock absorbing mechanism therefor including, an endwise movable rack operated by movement of the carriage, co-operating rotary clutch members one within the other, means for causing a clutching relation between said members upon rotation of one member, an operating connection between said one member and said rack, friction discs fixed upon opposite sides of the other member to rotate therewith, a pair of non-rotatable friction discs for clamping said rotatable discs therebetween, and means for varying the clamping action of the non-rotatable discs.

In testimony whereof I affix my signature.
HARRY A. FOOTHORAP.